United States Patent Office.

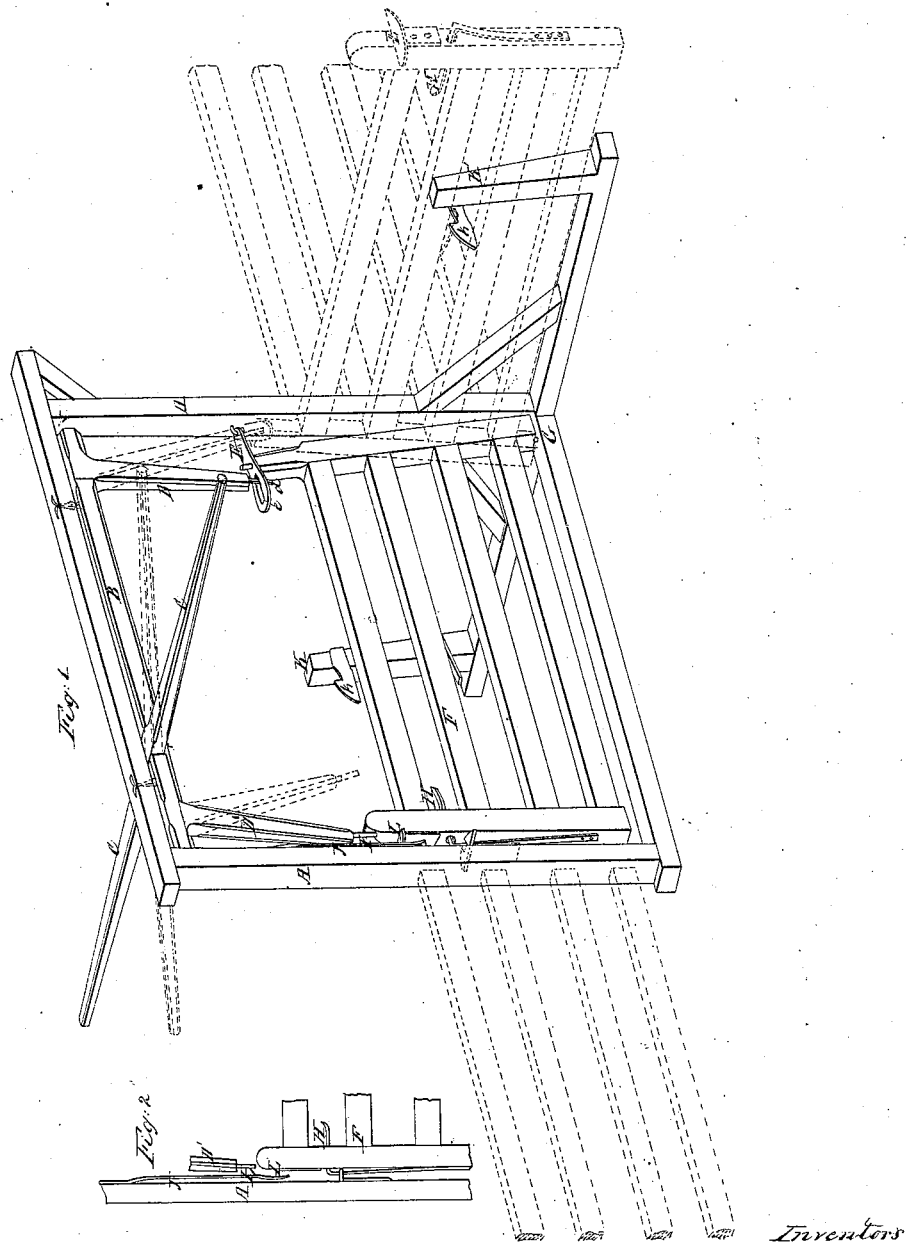

IMPROVEMENT IN GATES.

E. PETTEYS AND T. C. LEGGETT, OF CHESTERTOWN, NEW YORK.

Letters Patent No. 60,551, dated December 18, 1866.

*The Schedule referred to in these Letters Patent and making part of the same.*

TO ALL WHOM IT MAY CONCERN:

Be it known that we, ELI PETTEYS and T. CLARKSON LEGGETT, of Chestertown, in the county of Warren, and State of New York, have invented a new and useful Improvement in Gates; and we do hereby declare the following to be a full, clear, and exact description of the same, sufficient to enable one skilled in the art to which the invention appertains, to make use of it, reference being had to the accompanying drawings, which form a part of this specification, and in which—

Figure 1 is a perspective view.

Figure 2 is an elevation of the latch.

The gate is operated by inclining the heel-post, which gives it a tendency to swing in either direction, and, if fastened, unlatches it. The heel-post is inclined by an arm from a rock-shaft above, which is operated by extended horizontal arms within reach of an equestrian or the driver of a vehicle. In the drawings—

A A are the gate-posts, united by a beam above; B is a rock-shaft, whose ends are pivoted into the posts so as to be permitted to rotate in a vertical plane when moved by means of either of the horizontally-extended arms, C C, the downward projecting arm D extending to the link E, by which the upper end of the heel-post of the gate is secured to the gate-post A. The gate F may be of any suitable construction, but its hinges consist of a pivotal socket, G, at the lower end of the heel-post F' and a link, E, at the upper end, which permits a given extent of inclination of the said heel-post, and a slot, e, in the link is traversed by the pin d at the lower end of the arm D as the latter is moved. H is the usual latch of the gate, which retains it in its closed position by engagement with a notch therein, the gate swinging either way. D' is an arm, extending down from the rock-shaft B; its purpose is to limit the rotation of the rock-shaft by engagement with the palette I in the spring-plate J under the circumstances to be described when treating of the operation. Posts K K', on either side of the gate, are provided with latches $k$ to retain the gate in its open position.

The operation is as follows:

The gate being closed, and an equestrian coming along the road, reaches one of the arms C and draws it down. This inclines the heel-post of the gate away from him and draws it out of contact with the catch, when it swings open in the direction of its inclination until it reaches the catch $k$, which holds it open. The extent of the inclination is determined by the slotted link E. The traveller, having passed through the gateway, grasps the other arm C and depresses it, which brings the heel-post of the gate to a vertical position and detaches the catch $k$, the gate swinging shut and latching. To prevent the arm D' from passing beyond the centre the palette latch acts as a detent, and when the gate closes the plate L thereon closes the palette towards the post so as to leave the arm D' free for operation in either direction.

Having described my invention, what I claim therein as new, and desire to secure by Letters Patent, is—

1. The arrangement, with the gate F and link-hinge E, of the rock-shaft B and arms D D', substantially as described.

2. The arrangement of the palette I, plate L, and arm D', as and for the purpose described.

ELI PETTEYS,
T. C. LEGGETT.

Witnesses as to T. C. LEGGETT:
  SOLON C. KEMON,
  AUGUST TANNER.

Witnesses as to ELI PETTEYS:
  WM. SCOFIELD,
  N. ALBRO.